United States Patent
Chen et al.

(10) Patent No.: US 9,025,703 B2
(45) Date of Patent: May 5, 2015

(54) SOFTWARE RADIO SYSTEM, DECODING APPARATUS AND METHOD THEREOF

(75) Inventors: Jian Wen Chen, Beijing (CN); Yong Hua Lin, Beijing (CN); Qing Wang, Beijing (CN); Rong Yan, Beijing (CN); Hai Zhan, Beijing (CN); Zhen Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/305,791

(22) Filed: Nov. 29, 2011

(65) Prior Publication Data

US 2012/0134449 A1 May 31, 2012

(30) Foreign Application Priority Data

Nov. 30, 2010 (CN) .......................... 2010 1 0580312

(51) Int. Cl.
*H04L 27/06* (2006.01)
*H04L 1/00* (2006.01)
(52) U.S. Cl.
CPC ................................. *H04L 1/0052* (2013.01)
(58) Field of Classification Search
USPC ......... 375/147, 148, 260, 262, 265, 340, 341, 375/349; 714/752, 774, 820
See application file for complete search history.

(56) References Cited

U.S. PATENT DOCUMENTS

| | | | | |
|---|---|---|---|---|
| 5,717,471 A | * | 2/1998 | Stewart ........................... | 348/726 |
| 5,982,819 A | * | 11/1999 | Womack et al. .............. | 375/316 |
| 8,335,979 B2 | * | 12/2012 | Pisek et al. ..................... | 714/800 |
| 8,379,781 B2 | * | 2/2013 | Yang et al. ..................... | 375/347 |
| 8,497,787 B2 | * | 7/2013 | Yang ................................ | 341/67 |
| 2007/0104455 A1 | * | 5/2007 | Kikuchi ........................... | 386/68 |
| 2008/0187232 A1 | * | 8/2008 | Koizumi et al. .............. | 382/233 |
| 2009/0135963 A1 | | 5/2009 | Yang et al. | |
| 2010/0215011 A1 | * | 8/2010 | Pan et al. ....................... | 370/329 |
| 2010/0278222 A1 | * | 11/2010 | De Lind Van Wijngaarden et al. ............................. | 375/220 |

(Continued)

FOREIGN PATENT DOCUMENTS

| CN | 101132204 A | 2/2008 |
|---|---|---|
| CN | 101494489 A | 7/2009 |

(Continued)

OTHER PUBLICATIONS

Matsuda, T., et al, "Multicast Communications with Reed Solomon/Network Joint Coding in Wireless Multihop Networks," Journal of Communications, vol. 4, No. 11, Dec. 2009, pp. 856-864.

*Primary Examiner* — Dac Ha
(74) *Attorney, Agent, or Firm* — Cantor Colburn LLP

(57) ABSTRACT

The present invention relates to a software radio system and a decoding apparatus and method thereof. According to an embodiment of the present invention, there is provided a forward error correction decoding apparatus for a software radio system, including: a receiving module for receiving decoding tasks from a plurality of uplink channels; and a decoder matrix for executing the decoding tasks, wherein the decoder matrix is shared by the plurality of uplink channels. The decoding apparatus and method as well as the software radio system according to the embodiments of the present invention can be well adapted to the high computing capabilities, sufficient flexibility and scalability as required by base station systems for next-generation wireless communication systems.

26 Claims, 9 Drawing Sheets

(56) References Cited

U.S. PATENT DOCUMENTS

2011/0134969 A1* 6/2011 Pisek et al. .................... 375/147
2011/0289382 A1* 11/2011 Shih et al. .................... 714/763

FOREIGN PATENT DOCUMENTS

| WO | WO 2005/004365 A2 | 1/2005 |
| WO | WO 2005/004365 A3 | 1/2005 |

* cited by examiner

| Data block index | QoS | SNR | Length | Bit width | Data |
|---|---|---|---|---|---|
| | | | | | |

SOFTWARE RADIO SYSTEM, DECODING APPARATUS AND METHOD THEREOF

CROSS-REFERENCE TO RELATED APPLICATIONS

This application claims priority under 35 U.S.C. §119 from Chinese Patent Application No. 201001058031 2.6 filed Nov. 30, 2010, the entire contents of which are incorporated herein by reference.

BACKGROUND OF THE INVENTION

The present invention relates to forward error correction decoding, and more specifically, to forward error correction decoding for a software radio system.

Wireless communication technology develops day by day. High computing capabilities, sufficient flexibility and scalability are not only development trends but also challenges confronting base station systems for next-generation wireless communication systems. For example, an Long Term Evolution (herein "LTE") system requires high data throughput, such as 100 Mbps downlink and 50 Mbps uplink. Further, in an LTE system, part of the data (e.g., downlink broadcast channel BCH, downlink control information DCI, and par of uplink control information UCI) requires Viterbi decoding, whereas part of the data (e.g., uplink shared channel UL-SCH, downlink shared control channel DL-SCH, paging channel PCH, multicast channel MCH) requires Turbo decoding.

A traditional base station, especially a baseband processing portion therein, is mainly constructed based on various kinds of dedicated hardware designs and exhibits relatively poor flexibility and scalability. In order to be adapted to different standards and different application features supported by next-generation wireless communication systems, different models or amounts of dedicated chips need to be used in most cases, and further the hardware platform of a base station has to be re-developed. Hence, the traditional base station based on dedicated hardware designs can no longer satisfy requirements of a future wireless communication system.

In particular, physical layer processing usually occupies more than 80% of the total computation load of baseband processing of a base station, while forward error correction (FEC) decoding consumes more than 70% of the computation load of physical layer processing. For example, WiMAX Viterbi decoding usually requires single-threaded performance of 22.3 Mbps in case of 4-bit soft input decision, and WiMAX Turbo Code decoding requires single-threaded performance of 0.7 Mbps in case of six times of iterations. At present, the requirement for mass computation of FEC decoding processing is mainly solved by Application Specific Integrated Circuits (herein "ASIC") techniques and chip sets. However, the dedicated hardware design based on ASIC techniques is rather poor in flexibility and scalability and thus fails to meet requirements of next-generation mobile communication. Common codec techniques in modern communication, including convolutional code, parity check code, Viterbi code, Turbo code, etc., belong to FEC code techniques. Hereinafter, encoding or decoding is referred to as FEC encoding or FEC decoding, unless otherwise specified.

In view of the foregoing problems, there is a need for a base station system suitable for a next-generation wireless communication system. Particularly, there is a need for an effective, flexible decoding solution suitable for such a base station system.

BRIEF SUMMARY OF THE INVENTION

It is an object of the present invention to provide a new base station system capable of satisfying requirements of a next-generation communication system, and a decoding apparatus and method thereof, which can achieve high computing capabilities, sufficient flexibility and scalability.

According to an aspect of the present invention, there is provided a decoding apparatus for a software radio system, which includes: a receiving module for receiving decoding tasks from a plurality of uplink channels; and a decoder matrix for executing the decoding tasks, wherein the decoder matrix is shared by the plurality of uplink channels.

According to another aspect of the present invention, there is provided a decoding method of a software radio system, which includes: executing, by a decoder matrix, decoding tasks received from a plurality of uplink channels, wherein the decoder matrix is shared by the plurality of uplink channels.

According to a further aspect of the present invention, there is provided a software radio system, which includes: a plurality of radio frequency header modules, which generate decoding tasks of a plurality of uplink channels; and a decoding apparatus as described above.

BRIEF DESCRIPTION OF THE DRAWINGS

Other characteristics and advantages of the invention will become obvious in combination with the description of accompanying drawings, wherein the same number represents the same or similar parts in all figures.

DETAILED DESCRIPTION OF THE INVENTION

Figure 1:
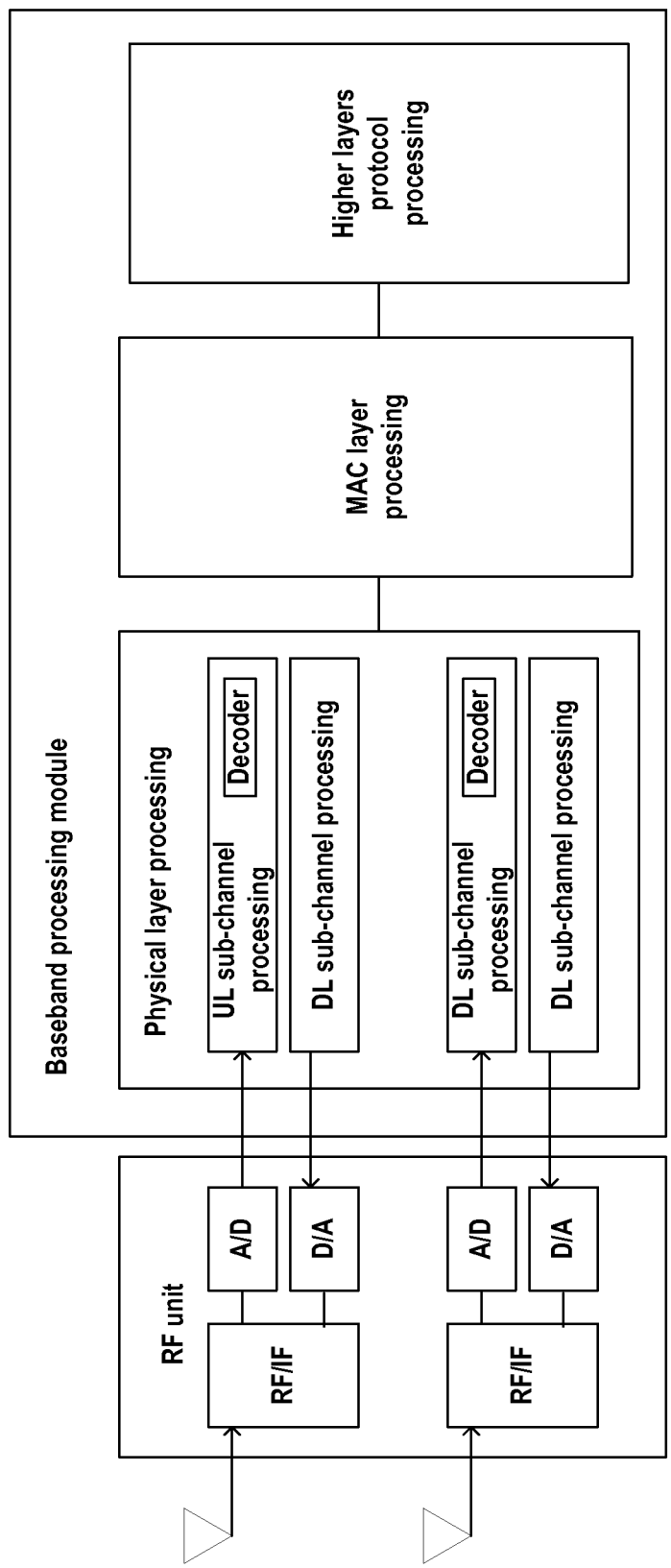
FIG. 1 illustrates a schematic view of the architecture of a traditional base station.

FIG. 1 illustrates a block diagram of the architecture of a traditional communication base station. The base station includes a radio frequency portion and a baseband processing portion. The radio frequency portion is for transmitting and receiving radio signals, which includes antennas and RF processing units. The baseband processing portion receives uplink data from the radio frequency portion and transmits downlink data to the radio frequency portion. There is usually a plurality of uplink/downlink channels, whose number is equal to the number of data channels of the radio frequency portion. The baseband processing portion includes physical layer processing, MAC layer processing, higher layers protocol processing, etc.

FEC decoding is an important part of baseband processing of radio signals. As described above, FEC decoding requires a mass computation load. In order to satisfy the requirement of mass computation, FEC decoding is usually solved by ASIC techniques and chip sets. As illustrated in FIG. 1, each uplink channel is configured with a dedicated decoder in traditional base station solutions. However, such a design has relatively poor flexibility and scalability. For example, if data channels are added for increase of system capacity, a corresponding number of decoders need to be added. For another example, when the system is upgraded to support a different standard, corresponding decoders need to be replaced. In such circumstances, a baseband processing module of the base station needs to be re-designed, which causes a waste of resources. For both operators and equipment manufactures, the development and management cost of the traditional base station is very high.

Figure 2:
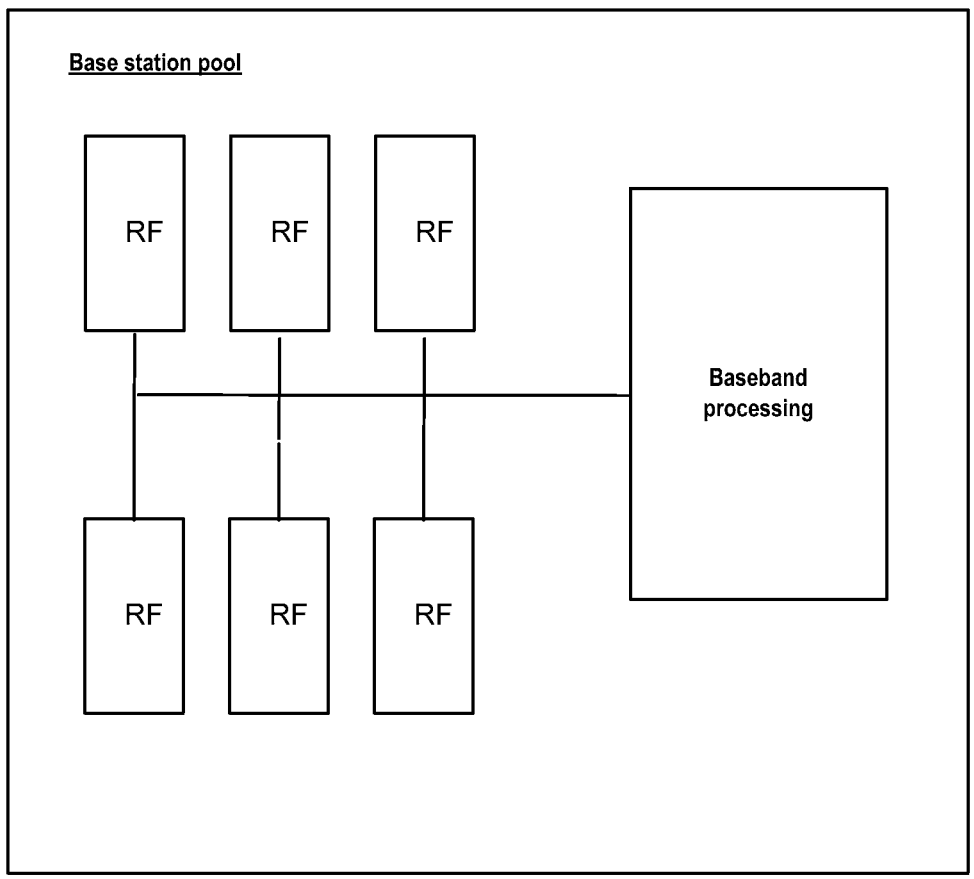
FIG. 2 illustrates a schematic view of the architecture of a base station pool.

For purposes of flexible and scalable system deployment, it has been proposed to separate the base station's radio frequency portion from the baseband processing portion such that baseband processing portions of a group of base stations are implemented in a concentrated way, just as illustrated in FIG. 2. This group of base stations is referred to as a "base station pool," and such base stations are referred to as virtual base stations. When the system needs to support different coverages and other application features, it is desirable that the baseband processing portion of the base station pool be adapted to a change of the radio frequency portion (for example, one more virtual base station is added). Operators already accept the concept of the base station pool. However, the traditional baseband processing design for base stations, especially the solution of dedicated decoders, cannot satisfy the flexibility and scalability. Therefore, an effective, flexible implementation of decoding becomes the main bottleneck that prevents the concept of the base station pool from applying to actual systems.

Embodiments of the present invention propose such a solution as to design a base station system using software radio techniques. The base station system designed as such is also referred to as a software radio system. The base station system can be a base station with a plurality of antennas or a base station pool with a plurality of base stations. The embodiments of the present invention further propose a decoding solution suitable for such a software radio system. Solutions proposed by the embodiments of the present invention can satisfy flexibility and scalability required by future wireless communication systems and can bring the concept of the base station pool to actual systems.

A main idea of the embodiments of the present invention is to decode data from a plurality of uplink channels by a shared decoder matrix using software radio techniques, without configuring dedicated decoders for each channel as in the prior art. With the decoding solution of the present invention, resource sharing and flexible configuration are achieved.

Figures 3A, 3B:
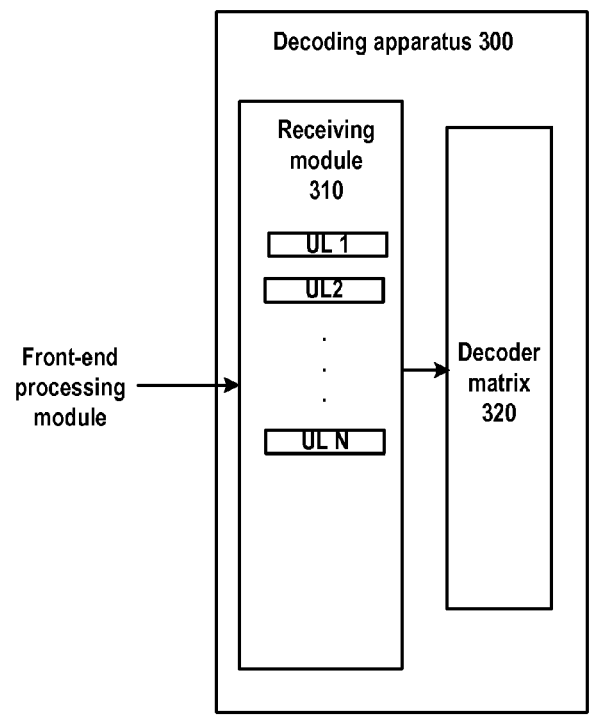
FIG. 3a illustrates a decoding apparatus according to an embodiment of the present invention.
FIG. 3b illustrates a data frame structure corresponding to a decoding task according to an embodiment of the present invention.

FIG. 3a illustrates a decoding apparatus 300 according to an embodiment of the present invention. The decoding apparatus 300 includes a receiving module 310 and a decoder matrix 320.

The receiving module 310 is for receiving decoding tasks from a plurality of uplink channels (UL). For example, each decoding task corresponds to one encoded data block to be decoded that is obtained from front-end processing of uplink data received from the radio frequency portion. The front-end processing includes, for example, unpacking, demapping and demodulation. The decoding tasks can be represented by data frames, including encoded data blocks to be decoded and related information. FIG. 3b schematically illustrates an optional structure for such data frames, which includes data block index, data to be decoded, and related information. The related information includes, for example, quality of service (QoS), signal-to-noise ratio (SNR), length of a data block, and/or bit width. The information is to be used by the decoder matrix during decoding. It should be understood that the data frame structure illustrated in FIG. 3b is only for illustration. Concrete data included in the data frame structure and the sequence thereof can differ in different embodiments. The receiving module 310 can receive, either in parallel or in series, decoding tasks from a plurality of channels.

The decoder matrix 320 is for executing the decoding tasks received by the receiving module 310 from a plurality of uplink channels. When the decoder matrix 320 includes only one decoder, the decoding tasks received by the receiving module 310 from a plurality of uplink channels can be directly executed by the decoder matrix 320. If the decoder matrix 320 includes a plurality of identical decoders, the decoding tasks received by the receiving module 310 from a plurality of uplink channels can be directly executed by one of the decoders respectively in the decoder matrix 320 in sequence or at random.

Preferably, the decoder matrix can include a multitude of decoders. Preferably, these decoders can support different decoding modes so as to be adapted to different standards or next-generation wireless communication standards requiring various decoding modes, such as LTE. For example, a part of these decoders can support Viterbi decoding, another part support Turbo decoding, and so on. In the decoder matrix, the decoding tasks from a plurality of uplink channels can be allocated to respective decoders supporting required decoding modes. It is preferable to perform a load balance between respective decoders, so as to efficiently utilize resources and achieve efficient decoding.

The decoder matrix can be implemented in software, hardware, or a combination thereof. For example, decoders in the decoder matrix can be implemented using dedicated decoding chips or chip sets. Preferably, the decoder matrix can be implemented using an application-specific integrated circuit (ASIC), a field programmable gate array (FPGA), or a digital signal processor (DSP) in the entirety. Alternatively, the decoder matrix can be implemented using software on a multi-core chip IT computing platform. Or, the decoder matrix can be implemented on a multi-core chip IP computing platform in conjunction with ASIC, FPGA, or DSP.

Figure 4:
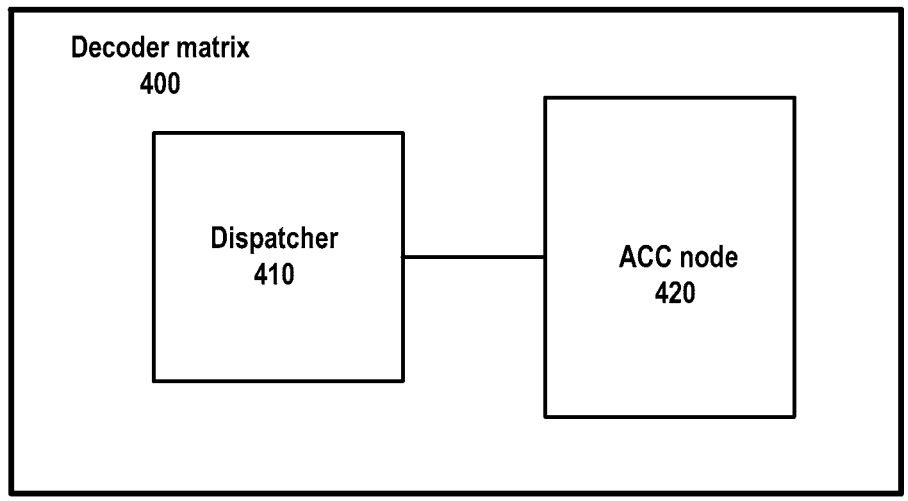
FIG. 4 illustrates a schematic view of a decoder matrix according to a preferred embodiment of the present invention.

FIG. 4 illustrates a decoder matrix 400 according to a preferred embodiment of the present invention. The decoder matrix 400 includes a dispatcher 410 and an accelerator node (referred to as ACC node for short) 420. The dispatcher 410 is for scheduling decoding tasks received from a plurality of uplink channels. The ACC node 420 is for executing the decoding tasks as scheduled by the dispatcher. The ACC node 420 can be a set of high-speed decoders implemented using various techniques that are currently known or to be developed in future. For example, the ACC node can be an ASIC accelerator that implements decoding by using ASIC, an FPGA accelerator implemented by using FPGA, or an accelerator implemented by using multi-core IT technique.

Preferably, the dispatcher 410 is not only for determining decoders executing decoding tasks but also for determining a location of a decoding task in a waiting queue of a corresponding decoder and/or for adjusting parameters used for executing decoding tasks.

Preferably, in an embodiment the dispatcher 410 can schedule decoding tasks according to at least one of the following information: decoding mode, load on a decoder, decoding path latency, QoS (e.g., latency requirements on data blocks), SNR, and MAC layer scheduling result.

In an embodiment supporting LTE, there are different decoders supporting different decoding modes (for example, supporting Viterbi decoding and Turbo decoding). The dispatcher 410 will allocate a decoding task to a decoder supporting its decoding mode, by considering decoding modes of the decoding tasks during scheduling. For example, the dispatcher 410 will allocate to Viterbi decoders decoding tasks from BCH, DCI, and UCI in the LTE system and allocate to Turbo decoders decoding tasks from UL-SCH, DL-SCH, PCH, and MCH.

Preferably, the dispatcher 410 will allocate decoding tasks to proper decoders by considering workloads of respective decoders at the ACC node 420, so as to achieve a load balance.

Optionally, the dispatcher 410 can estimate decoding path latencies that will be produced when a decoding task is allocated to different decoders at the ACC node 410 respectively. Or the dispatcher 410 can monitor historical decoding path latencies on respective decoders. Then, the decoding task is allocated to a decoder corresponding to a minimum decoding path latency.

Optionally, the dispatcher 410 can allocate a decoding task to any one of decoders that satisfy its QoS requirement (for example, the estimated decoding path latency is less than or equal to the latency requirement on a data block).

Optionally, the dispatcher 410 can further implement scheduling according to MAC layer scheduling information. For example, when MAC layer scheduling information indicates that burst uplink data will come, the dispatcher 410 will reserve enough decoder resources for decoding the incoming burst data, and where necessary, discard or suspend decoding tasks at a low priority level.

Preferably, the dispatcher 410 can allocate a currently scheduled decoding task before a scheduled task whose priority level is lower than that of the currently scheduled decoding task. For example, when there is an urgent task (e.g., a real-time voice service) with a high priority level, the dispatcher 410 can allocate this urgent task before a scheduled decoding task with a lower priority level or discard a scheduled decoding task with a low priority level. For example, if a scheduled task whose priority level is lower than that of the urgent task is not considered, decoding path latencies required by different decoders for executing the urgent decoding task are estimated, then the urgent task is allocated to a decoder with a minimum estimated decoding path latency, and accordingly, the scheduled decoding task with a low priority level is suspended or discarded.

Optionally, the dispatcher 410 can adjust decoding parameters. The decoding parameters include, for example, a parallel algorithm selected for decoding, or the number of iterations. For example, the dispatcher 410 can adjust the number of iterations according to SNR of a data block corresponding to a decoding task. For example, for Turbo decoding, the dispatcher 410 can reduce the number of iterations when SNR is relatively high, or can increase the number of iterations when SNR is relatively low. For example, the dispatcher 410 can compromise on a proper parallel algorithm according to the error rate requirement and the decoding latency requirement corresponding to a decoding task. For a real-time service that imposes a high requirement on a decoding latency but a low requirement on an error rate, a larger number of decoders can be selected for parallel decoding, and vice versa.

Optionally, when a load on the decoder matrix is relatively heavy, the dispatcher 410 can adjust parameters used for executing decoding tasks, for example, reduce the number of iterations, so as to reduce computation complexity for decoding.

The ACC node 410 executes the decoding tasks as scheduled by the dispatcher 410. Preferably, the ACC node 410 can buffer the decoding tasks. For example, each decoder can include one or more queues. In view of the burst feature of wireless communication, the ACC 420 with a buffering capability can utilize decoder resources more efficiently.

Figure 5:
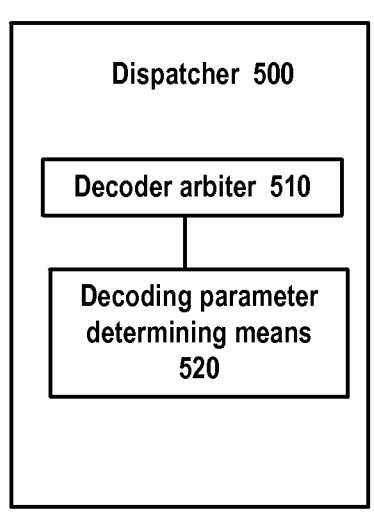
FIG. 5 illustrates a schematic view of an example of a dispatcher in the decoder matrix in FIG. 4.

FIG. 5 illustrates a specific implementation 500 of a dispatcher according to an embodiment of the present invention. The dispatcher 500 includes a decoder arbiter 510 for determining a decoder to which each decoding task is allocated. Preferably, the decoder arbiter 510 can determine decoders to which each decoding task is allocated, according to at least one of the following information: decoding mode, load on a decoder, decoding path latency, QoS (e.g., latency requirements on data blocks), SNR, and MAC layer scheduling result.

The dispatcher 500 further includes decoding parameter determining means 520 for determining parameters used for executing a decoding task, the parameter including a parallel algorithm used for executing a decoding task, the number of iterations, etc. Preferably, the decoding parameter determining means 520 can determine parameters used for executing a specific decoding task according to at least one of the following information: decoding mode, load on a decoder, decoding path latency, QoS (e.g., latency requirements on data blocks), SNR, and MAC layer scheduling result.

Figure 6:
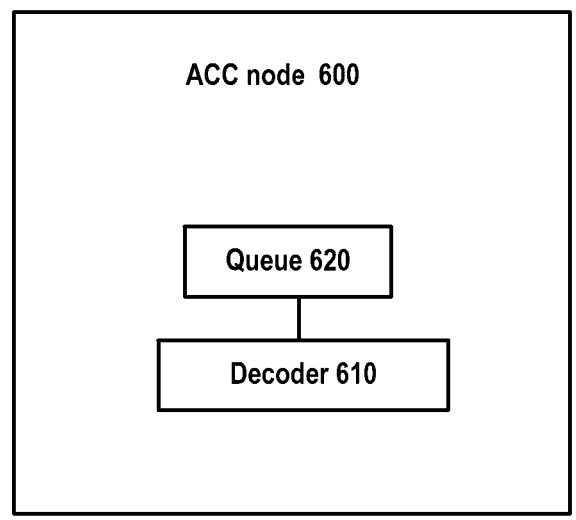
FIG. 6 illustrates a schematic view of an example of an accelerator node in the decoder matrix in FIG. 4.

FIG. 6 illustrates a specific embodiment 600 of an ACC node according to a preferred embodiment of the present invention. The ACC node 600 includes at least one decoder 610 and at least one queue 620. The decoder 610 is for decoding an allocated encoded data block, for example, Viterbi decoding or Turbo decoding. The queue 620 is for buffering a decoding task. One decoder 610 can correspond to one or more queues 620. Each decoder 610 and its corresponding queue(s) 620 can be treated as a decoder with a buffer.

Preferably, if the ACC node includes queues, the decoder arbiter 510 in the dispatch 500 can be implemented as a queue arbiter. The queue arbiter is for determining a queue to which a decoding task is allocated. When one decoder corresponds to more than one queue, for example, when there are queues corresponding to respective different priority levels, the queue arbiter can select a queue suitable for a decoder to which a decoding task is allocated, according to a priority level of the decoding task. For example, in an embodiment a decoder has two queues corresponding to a high priority level and a low priority level respectively, and the decoder executes tasks in the low-priority queue only when the high-priority queue is empty. In this case, the queue arbiter not only determines a decoder to which a decoding task is allocated, but also determines whether the decoding task is allocated to a high-priority queue or a low-priority queue of the decoder. Usually decoding tasks that have been scheduled sequentially line up in a queue to which they are allocated.

Preferably, the queue arbiter can further determine a location of a decoding task in a queue. The queue arbiter can compare priority levels of a currently scheduled decoding task and scheduled tasks, arrange the currently scheduled decoding task before a scheduled decoding task at a lower priority level, and suspend or discard the concerned decoding task at a lower priority level. For example, if a scheduled task whose priority level is lower than that of the currently scheduled decoding task is not considered, decoding path latencies required by different decoders for executing the currently scheduled decoding task are estimated, then the currently scheduled decoding task is allocated to a decoder with a minimum estimated decoding path latency, and accordingly, the scheduled decoding task with a low priority level is suspended or discarded.

A specific example of cooperation between the dispatcher and the ACC node will be described below with reference to FIGS. 4-6. Upon determining scheduling information of a decoding task, the dispatcher transmits a scheduling data frame to the ACC node. The scheduling data frame can include all information in the data frame corresponding to a decoding task as illustrated in FIG. 3b. Optionally, the scheduling data frame further includes parameters used for executing the decoding task, such as a parallel algorithm being used and the number of iterations. Preferably, when a parallel algorithm is used in a decoding task, a plurality of scheduled data frames will be generated, each of which corresponds to a part of the decoding task. The ACC node inserts the scheduling data frame into a corresponding queue according to the scheduling by the dispatcher. According to scheduling information, the currently scheduled data frame can be arranged at the end of a corresponding queue or inserted into other location of the queue, and/or a scheduled task existing in the queue is dropped. Preferably, the ACC node feeds its own status parameters back to the dispatcher, such as a load on a decoder and/or a result of executing a decoding task. The load on a decoder can be represented by a queue length. The result of executing a decoding task includes, for example, success, failure, and/or completion time and etc. The dispatcher can obtain an actual decoding latency of a decoding task from a timestamp. Then, the dispatcher performs subsequent scheduling according to the feedback information.

The decoding apparatus according to the embodiments of the present invention at least has one of the following advantages:

Resources are shared, decoding efficiency is improved, and the throughput is increased because decoding tasks of huge burst data can be processed through resource sharing.

Multiple applications and standards are supported. For example, Turbo decoding and Viterbi decoding are supported at the same time, and LTE, WiMAX and the like are supported.

Decoding tasks are dispatched efficiently. In the embodiments of the present invention, decoding tasks are scheduled by considering MAC layer scheduling information, SNR, decoding path latency, QoS, etc., so it is possible to strike a load balance with the knowledge of the above information and achieve optimal performance.

The configuration is flexible and a upgrade is enabled easily. When the number of data channels increases or other application features change, it is possible to easily update the design of the decoding apparatus by using radio software techniques, so as to be adapted to the change of the radio frequency portion without changing the hardware design platform.

Figure 7:
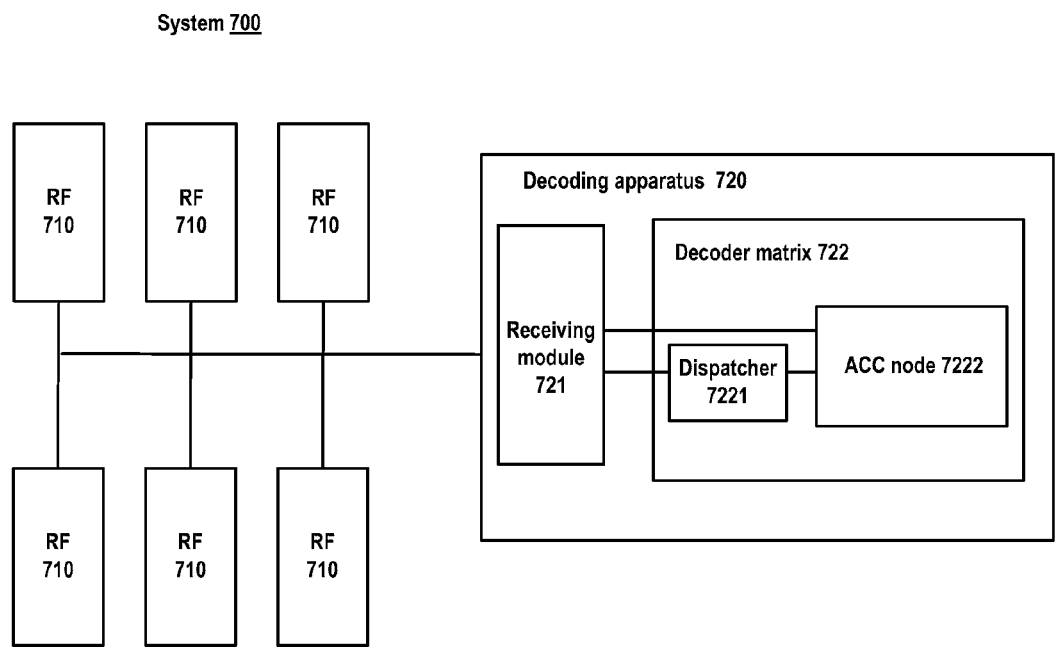
FIG. 7 illustrates a schematic view of a software radio system according to an embodiment of the present invention.

FIG. 7 illustrates a schematic view of a software radio system 700 according to an embodiment of the present invention. The software radio system 700 is, for example, a base station pool or a multi-antenna base station. The system 700 includes a plurality of radio frequency header modules 710 and a decoding apparatus 720 according to the present invention. The plurality of radio frequency header modules 710 generates decoding tasks of a plurality of uplink channels. Specifically, the radio frequency header module 710 includes an antenna and other processing modules, which processes uplink data received from the antenna, including RF/IF conversion, A/D conversion, unpacking, demodulation, etc., to thereby generate decoding tasks. The number of uplink channels corresponds to the total number of data channels in all radio frequency header modules. The decoding apparatus 720 receives the decoding tasks of a plurality of uplink channels from the plurality of radio frequency header modules 710 and decodes them in the form of decoder resource sharing. The decoding apparatus 720 can be any decoding apparatus according to an embodiment of the present invention as described above, e.g., a decoding apparatus as illustrated in FIG. 3.

As illustrated in FIG. 7, the decoding apparatus 720 includes a receiving module 721 and a decoder matrix 722. The receiving module 721 is for receiving decoding tasks from a plurality of uplink channels, which can receive, either in parallel or in series, the decoding tasks from a plurality of channels. The decoder matrix 722 is for executing the decoding tasks received by the receiving module 721 from a plurality of uplink channels. The decoder matrix can include a multitude of decoders. Preferably, these decoders can support different decoding modes so as to be adapted to different standards or next-generation wireless communication standards requiring various decoding modes, such as LTE. For example, part of these decoders can support Viterbi decoding, part support Turbo decoding, and so on. In the decoder matrix, the decoding tasks from a plurality of uplink channels can be allocated to decoders supporting required decoding modes. It is preferable to strike a load balance between respective decoders, so as to efficiently utilize resources and achieve efficient decoding.

Preferably, the decoder matrix 722 includes a dispatcher 7221 and an accelerator node (referred to as ACC node for short) 7222. The dispatcher 7221 is for scheduling decoding tasks received from a plurality of uplink channels. The ACC node 7222 is for executing the decoding tasks as scheduled by the dispatcher. The ACC node 7222 can be a set of high-speed decoders implemented using various techniques that are currently known or to be released in future.

Preferably, the dispatcher 7221 is not only for determining decoders executing decoding tasks but also for determining a location of a decoding task in a waiting queue of a corresponding decoder and/or for adjusting parameters used for executing decoding tasks.

The dispatcher 7221 can schedule decoding tasks according to at least one of the following information: decoding mode, load on a decoder, decoding path latency, QoS (e.g., latency requirements on data blocks), SNR, and MAC layer scheduling result.

Preferably, the dispatcher 7221 can allocate a currently scheduled decoding task before a scheduled task whose priority level is lower than that of the currently scheduled decoding task. For example, when there is an urgent task (e.g., a real-time voice service) with a high priority level, the dispatcher 7221 can allocate this urgent task before a scheduled decoding task with a lower priority level or discard a scheduled decoding task with a low priority level.

The ACC node 7222 executes the decoding tasks as scheduled by the dispatcher 7221. Preferably, the ACC node 7222 can buffer the decoding tasks. For example, each decoder can include one or more queues. In view of the burst feature of wireless communication, the ACC 7222 with a buffering capability can utilize decoder resources more efficiently.

Figure 8:
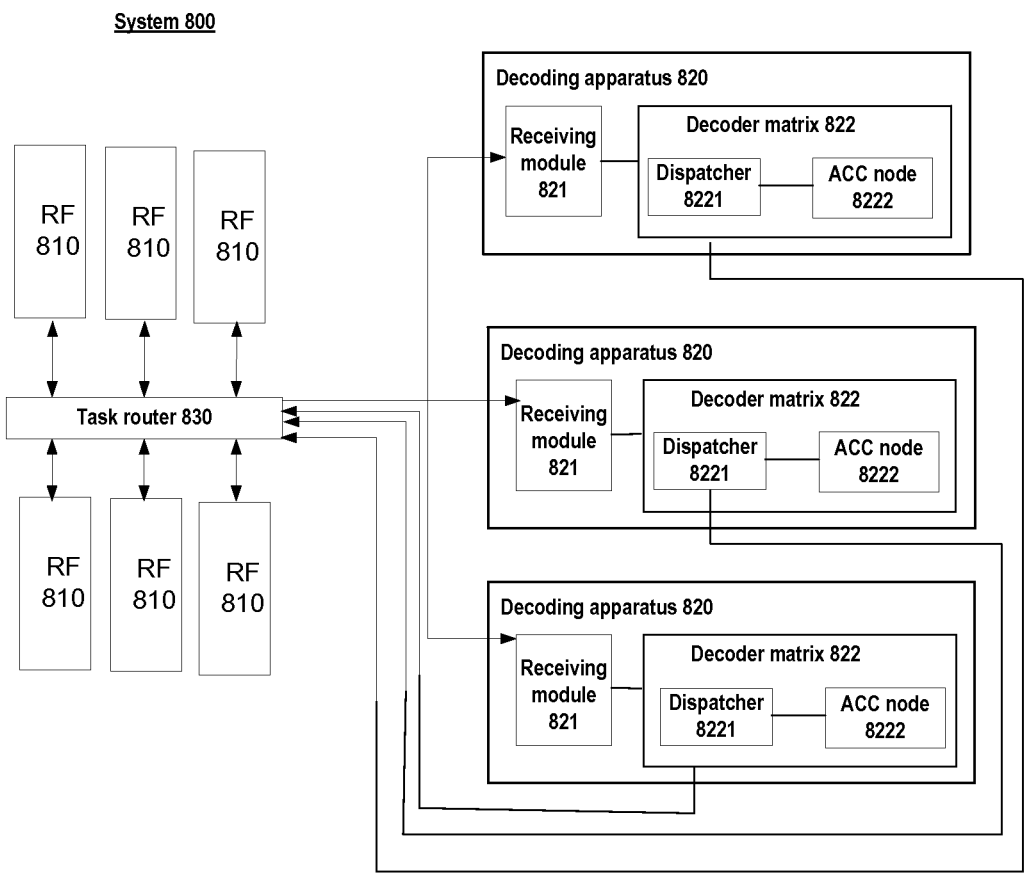
FIG. 8 illustrates a schematic view of a software radio system according to another embodiment of the present invention.

FIG. 8 illustrates a software radio system 800 according to another embodiment of the present invention. The software radio system 800 is, for example, a base station pool or a multi-antenna base station. The system 800 includes a plurality of radio frequency header modules 810 and a plurality of decoding apparatuses 820 according to the present invention. Like the plurality of radio frequency header modules 710, the plurality of radio frequency header modules 810 generate decoding tasks of a plurality of uplink channels. The decoding apparatus 820 is similar to the decoding apparatus 720. Thus, the radio frequency header module 810 and the decoding apparatus 820 are not detailed here. It can be seen that in the system 800 the decoding portion is a multilayered matrix structure, which includes a plurality of decoding apparatuses 820. Each decoding apparatuses 820 can include at least one ACC node 8222. As described above, each ACC node can be a set of a multitude of decoders (including a decoder with a buffer).

The system 800 further includes a task router 830 between the plurality of radio frequency header modules 810 and the plurality of decoding apparatuses 820. The task router 830 can be for routing to the respective decoding apparatuses 820 the decoding tasks of a plurality of uplink channels which are generated by the plurality of radio frequency header modules 810. The router 830 can further migrate a to-be-executed decoding task from one decoding apparatus 820 to another. Each decoding apparatus 820 executes a decoding task that has been routed to it. Further, each decoding apparatus 820 can feed its own status information back to the router 830, for example, feed information on respective ACC nodes as gathered by its dispatcher back to the router. The feedback information can include, for example, load on a decoder, queue length of a decoder, and decoding latency. Then, the router 830 performs subsequent routing according to the feedback information. In addition, the router 830 can strike a load balance between the respective decoding apparatuses 820 according to the feedback information, for example, migrate a decoding task from a decoding apparatus 820 with a heavy load or long decoding latency to a decoding apparatus 820 with a light load or short decoding latency.

The decoding apparatus according to the embodiments of the present invention at least has one of the following advantages:

Resources are shared, and base station throughput is increased.

Multiple applications and standards are supported. For example, and LTE, WiMAX and the like are supported at the same time.

The configuration is flexible and a upgrade is enabled easily. When coverage needs to be enlarged or other application features need to be supported, it is possible to easily update the design of the baseband processing portion (especially the decoding apparatus) of the base station or base station pool by using radio software techniques, so as to be adapted to the change of the radio frequency portion without changing the hardware design platform.

Based on the above advantages, the software radio system according to the embodiments of the present invention helps to put the concept of the "base station pool" into practical applications.

Hereinafter, a decoding method in a software radio system according to the present invention will be described. The decoding method according to an embodiment of the present invention includes receiving decoding tasks from a plurality of uplink channels and executing the decoding tasks by a decoder matrix shared by the plurality of uplink channels. Compared with the solution that each uplink channel uses its respective dedicated decoder in the prior art, the decoding method according to the embodiments of the present invention is more efficient and flexible.

In an embodiment, the step of executing the decoding tasks by a decoder matrix shared by the plurality of uplink channels includes scheduling the decoding tasks received from the plurality of uplink channels to corresponding decoders in a decoder matrix so as to decode them.

For example, the scheduling is implemented according to at least one of the following information: decoding mode, load on a decoder, decoding path latency, QoS (e.g., latency requirements on data blocks), SNR, and MAC layer scheduling result.

The scheduling can include dispatching the respective received decoding tasks to the decoders in the decoder matrix.

The scheduling can further include allocating a currently scheduled decoding task at a higher priority level before a scheduled decoding task at a lower priority level.

In another embodiment, the software radio system includes a plurality of decoder matrixes. The step of executing the decoding tasks by a decoder matrix shared by the plurality of uplink channels includes routing the decoding tasks received from the plurality of uplink channels to the respective decoder matrixes. Then, each decoder matrix executes a decoding task that has been routed to it. Preferably, it is further possible to migrate a to-be-executed decoding task from one decoder matrix to another.

Figure 9:
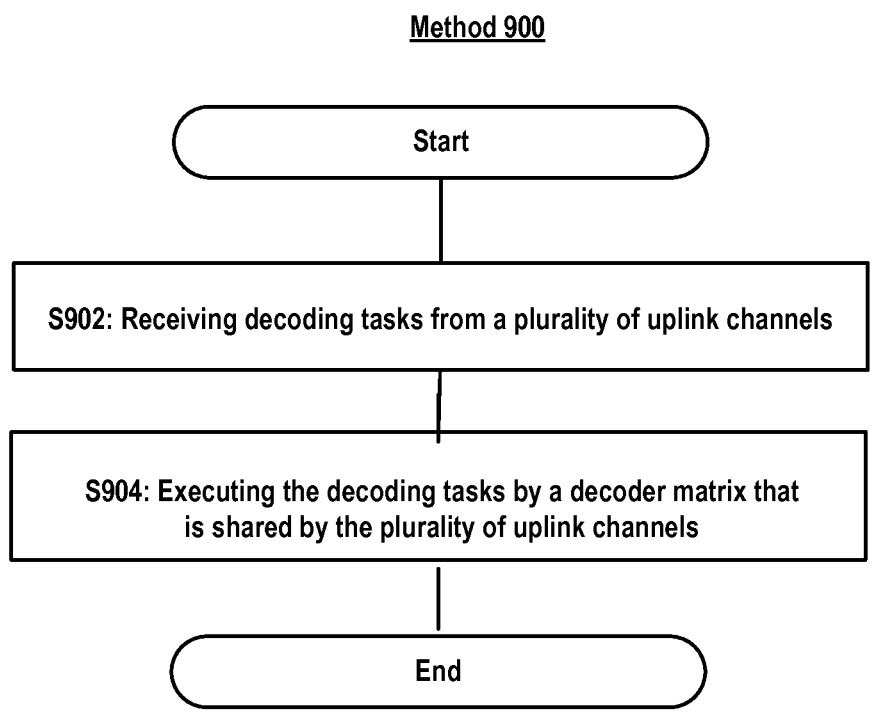
FIG. 9 illustrates a flowchart of a decoding method of a software radio system according to an embodiment of the present invention.

FIG. 9 illustrates a flowchart of a decoding method 900 for a software radio system according to an embodiment of the present invention. As illustrated in FIG. 9, decoding tasks are received from a plurality of uplink channels in step 902. The decoding tasks are executed by a decoder matrix shared by the plurality of uplink channels in step 904. Hereinafter, the decoding method according to the embodiments of the present invention will be described in detail with reference to the respective systems illustrated in FIGS. 7 and 8.

Figure 10:
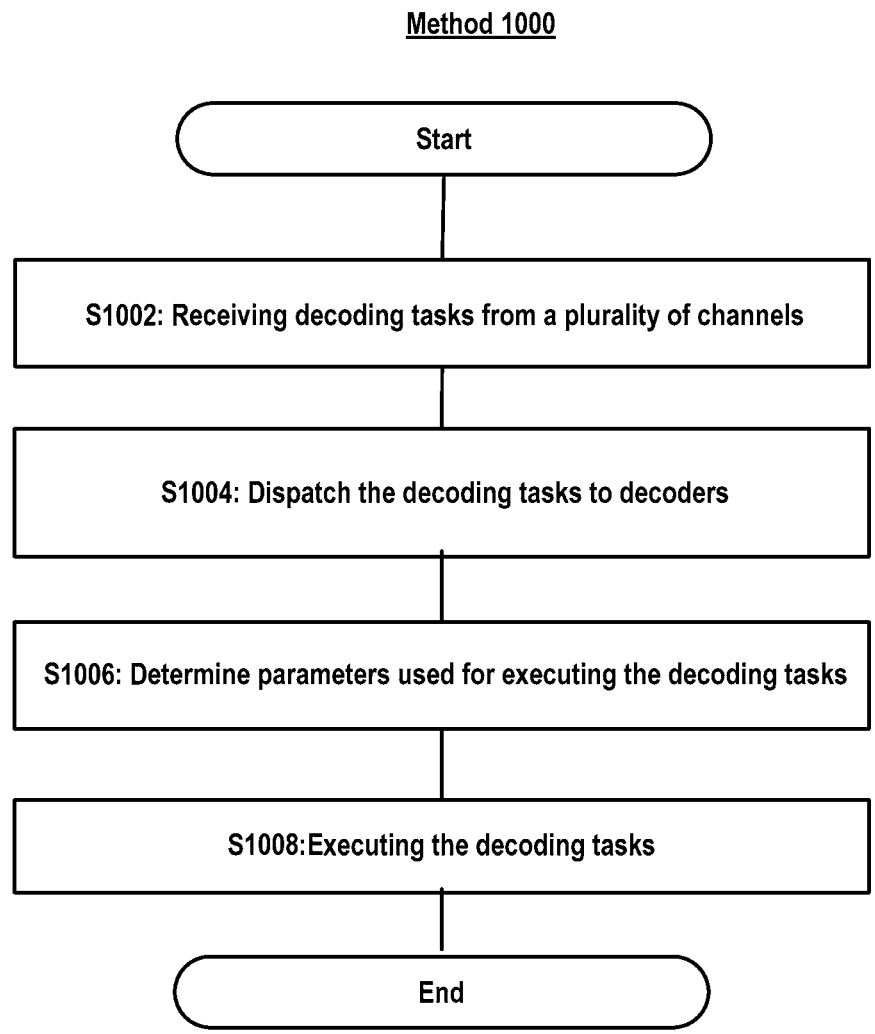
FIG. 10 illustrates a flowchart of a decoding method of a software radio system according to another embodiment of the present invention.

FIG. 10 illustrates a flowchart of a decoding method 1000 for a software radio system according to an embodiment of the present invention. The software radio system can be a multi-antenna base station and/or a base station pool, which includes a plurality of data channels. The software radio system can be, for example the system 700 as described above.

In step S1002, decoding tasks are received from a plurality of uplink channels. The number of the uplink channels corresponds to that of data channels in the radio frequency portion.

In step S1004, a decoding task is dispatched to a corresponding decoder in the decoder matrix so as to be decoded. If the decoder matrix further includes queues for buffering decoding tasks, step S1004 can further include determining a queue of a decoder to which the decoding task is dispatched. Optionally, step S1004 can further include determining a location of the decoding task in the queue. For example, the decoding tasks are dispatched in step S1004 according to at least one of the following information: decoding mode, load on a decoder, decoding path latency, QoS (e.g., latency requirements on data blocks), SNR, and MAC layer scheduling result.

In step S1004, the decoding task is only dispatched to decoders that support its decoding mode.

Preferably, in step S1004, a workload on each decoder in the decoder matrix will be considered such that the decoding task is preferably dispatched to a decoder having a light workload so as to strike a load balance.

Preferably, in step S1004, decoding path latencies that are produced when the decoding task is dispatched to different decoders are estimated, or when historical decoding path latency on each decoder can be monitored. Then, the decoding task is dispatched to a decoder that corresponds to a minimum estimated decoding path latency or a minimum historical decoding patch latency average.

Optionally, in step S1004, the decoding task is dispatched to any one of decoders that satisfy its QoS requirement (for example, the estimated decoding path latency is less than or equal to the latency requirement on a data block).

Preferably, in step S1004, the dispatch is implemented according to MAC layer scheduling information. For example, when MAC layer scheduling information indicates that burst uplink data will come, enough decoder resources can be reserved for decoding the incoming burst data, and where necessary, decoding tasks at a low priority level can be discarded or suspended.

Preferably, in step S1004, a currently scheduled decoding task can be allocated before a scheduled task whose priority level is lower than that of the currently scheduled decoding task. For example, when there is an urgent task (e.g., a real-time voice service) with a high priority level, this urgent task can be allocated before a scheduled decoding task with a lower priority level, or a scheduled decoding task with a low priority level can be discarded.

In step S1006, parameters used for executing the decoding task are adjusted. The decoding parameters include, for example, a parallel algorithm selected for decoding, or the number of iterations. For example, the number of iterations can be adjusted according to SNR of a data block corresponding to the decoding task. For example, for Turbo decoding, the number of iterations can be reduced when SNR is relatively high, or the number of iterations can be increased when SNR is relatively low. For example, a proper parallel algorithm can be selected according to a compromise between the error rate requirement and the decoding latency requirement corresponding to the decoding task. For a real-time service that imposes a high requirement on a decoding latency but a low requirement on an error rate, decoders in a larger number can be selected for parallel decoding, and vice versa.

In step S1008, the decoding task is executed. Specifically, each decoder executes the decoding task that has been dispatched to it, according to the parameters determined in step S1006. Where the decoder has a corresponding queue that is buffering decoding tasks, the decoder will execute the decoding tasks in the queue in sequence. Step S1008 further includes various queue operations, for example, performing queue insertion, queue drop and the like according to the dispatch in step S1004.

Then the method 1000 ends.

It should be noted that the flowchart illustrated in FIG. 10 is merely exemplary. Those skilled in the art would readily contemplate various modifications and alterations. For example, steps S1004 and S1006 can be executed in parallel, or step S1006 is executed first and step S1004 is executed subsequently.

Figure 11:
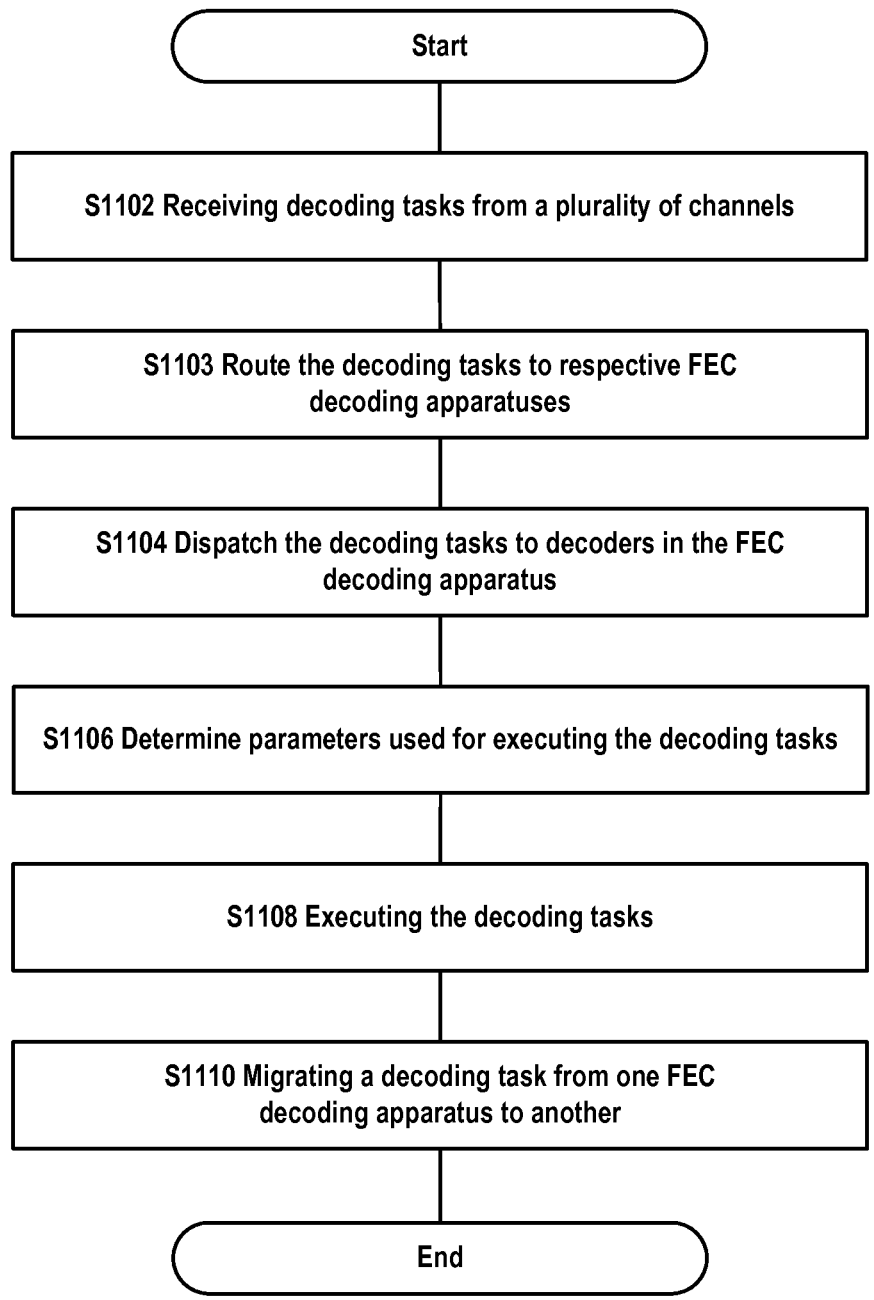
FIG. 11 illustrates a flowchart of a decoding method of a software radio system according to a further embodiment of the present invention.

FIG. 11 illustrates a flowchart of a decoding method 1100 for a software radio system according to another embodiment of the present invention. The software radio system can be a multi-antenna base station and/or a base station pool, which includes a plurality of data channels. The software radio system can be, for example the system 800 as described above, which includes a task router in addition to a plurality of decoding apparatuses. The method 1100, which is similar to the method 1000, differs in further including step S1103. Hereinafter, steps similar to those of the method 1000 will not be detailed.

In step S1102, the task router receives decoding tasks from a plurality of uplink channels.

In step S1103, the task router routes the decoding tasks received from the plurality of uplink channels to the respective decoding apparatuses.

In step S1104, the decoding task is further dispatched to a corresponding decoder in the decoder matrix so as to be decoded.

In step S1106, parameters used for executing the decoding task are determined.

In step S1108, the decoding task is executed.

Then the method 1100 ends.

Optionally, the method 1100 can include other steps. For example, the method 1100 further includes a decoding task migrating step in which a to-be-executed decoding task that has been dispatched is migrated from one decoding apparatus to another. By migrating decoding tasks between decoding apparatuses, a load balance is stricken, and further, major resources of a certain decoding apparatus are reserved for executing a new decoding task that corresponds to burst data.

For example, the method 1100 further includes a feedback step in which the decoding apparatus feeds its own status information back to the router, for example, feeds information on respective decoders as gathered by its dispatcher back to the router. The feedback information includes, for example, load on a decoder, queue length of a decoder, and decoding latency. Then, the task router can use the feedback information to perform subsequent routing and to migrate decoding tasks between decoding apparatuses.

The decoding method according to the embodiments of the present invention achieves resource sharing and efficient dispatch of decoding tasks, improves decoding efficiency and supports multiple applications and standards.

The decoding methods and the software radio systems according to the embodiments of the present invention can be well adapted to the high computing capabilities, sufficient flexibility and scalability as required by base station systems for next-generation wireless communication systems.

It should be noted that in order to facilitate easier understanding of the present invention, the foregoing description omits more detailed technical details that are well known to those skilled in the art and might be indispensable to the implementation of the present invention.

The specification of the present invention has been presented for purposes of illustration and description, and is not intended to be exhaustive or limited to the invention in the form disclosed. Many modifications and variations will be apparent to those of ordinary skill in the art. Those skilled in the art would readily appreciate that the methods and apparatuses in the embodiments of the present invention can be implemented in various forms of software, hardware, firmware, or combinations thereof.

Therefore, the embodiments were chosen and described in order to best explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A decoding apparatus for a software radio system, comprising:
   a decoder matrix that receives a plurality of decoding tasks of received data;

wherein the plurality of decoding tasks are received through a plurality of channels;
wherein the plurality of channels comprises at least one of a broadcast channel (BCH), a downlink control information (DCI) channel, or an uplink control information (UCI) channel; and
wherein the plurality of channels further comprise at least one of an uplink shared channel (UL-SCH), a downlink shared control channel (DL-SCH), a paging channel (PCH), or a multicast channel (MCH);
a first decoder that supports a first decoding mode;
a second decoder that supports a second decoding mode; and
the decoder matrix comprising a dispatcher that allocates a first type of the plurality of decoding tasks to the first decoder based on receiving over any one of the plurality of channels the first decoding mode, and further allocates a second type of the plurality of decoding tasks to the second decoder based on receiving over any one of the plurality of channels the second decoding mode.

2. The decoding apparatus according to claim 1, wherein the dispatcher schedules the plurality of decoding tasks according to at least one of the following information:
load on a decoder, decoding path latency, quality of service, signal-to-noise ratio, and MAC layer scheduling result.

3. The decoding apparatus according to claim 1, further comprising at least one queue, wherein the decoder is for executing the received decoding tasks, and the queue is for buffering the received decoding tasks.

4. The decoding apparatus according to claim 1, wherein the dispatcher further comprises:
a decoder arbiter for determining the respective decoder to which each of the plurality of decoding tasks is dispatched; and
decoding parameter determining means for determining parameters used for executing the received decoding tasks.

5. The decoding apparatus according to claim 4, wherein the parameters comprise at least one of the following: a parallel algorithm being used, and the number of iterations.

6. The decoding apparatus of claim 1 wherein the plurality of decoding tasks comprise decoding a plurality of encoded error correction data blocks of the received data.

7. The decoding apparatus of claim 6 wherein the encoded error correction data blocks comprise forward error correction codes.

8. The decoding apparatus of claim 7 wherein
the first decoding mode comprises viterbi decoding.

9. The decoding apparatus of claim 7 wherein
the second decoding mode comprises turbo decoding.

10. The decoding apparatus of claim 1 wherein:
the dispatcher allocates to the first decoder the first type of the plurality of decoding tasks received through any one of the plurality of channels; and
the dispatcher allocates to the second decoder the second type of the plurality decoding tasks received through any one of the plurality of channels.

11. The decoding apparatus of claim 1 wherein the plurality of types of decoding tasks comprise decoding a plurality of encoded error correction data blocks associated with received data.

12. The decoding apparatus of claim 11 wherein the encoded error correction data blocks comprise forward error correction codes.

13. The decoding apparatus of claim 12 wherein:
the first decoding mode comprises viterbi decoding; and the second decoding mode comprises turbo decoding.

14. A decoding method of a software radio system, comprising the steps of:
receiving a plurality decoding tasks for received data;
wherein the plurality of decoding tasks are received through a plurality of channels;
wherein the plurality of channels comprises at least one of a broadcast channel (BCH), a downlink control information (DCI) channel, or an uplink control information (UCI) channel; and
wherein the plurality of channels further comprise at least one of an uplink shared channel (UL-SCH), a downlink shared control channel (DL-SCH), a paging channel (PCH), or a multicast channel (MCH);
allocating a first type of the plurality of decoding tasks to a first decoder based on receiving over any one of the plurality of channels a first decoding mode; and
allocating a second type of the plurality of decoding tasks to a second decoder based on receiving over any one of the plurality of channels a second decoding mode;
wherein the first decoder supports the first decoding mode and the second decoder supports the second decoding mode.

15. The decoding method according to claim 14, further comprising the steps of:
receiving the first type of the plurality of decoding tasks from a first one of the plurality of channels; and
receiving the second type of the plurality of decoding tasks from a second one of the plurality of channels.

16. The decoding method according to claim 15, wherein the software radio system comprises a first decoder apparatus and a second decoder apparatus, further comprising the steps of:
routing the first type of the plurality of decoding tasks from the first one of the plurality of channels to the first decoder apparatus; and
routing the second type of the plurality of decoding tasks from the second one of the plurality of channels to the second decoder apparatus.

17. The decoding method according to claim 16, further comprising:
migrating the first type of the plurality of decoding tasks from the first decoder apparatus to the second decoder apparatus.

18. The decoding method according to claim 14, further comprising the step of scheduling the first type of the plurality of decoding tasks according to at least one of the following information:
load on a decoder, decoding path latency, quality of service, signal-to-noise ratio, and MAC layer scheduling result.

19. The decoding method according to claim 18, further comprising:
determining parameters used for executing the plurality of decoding tasks.

20. The decoding method according to claim 19, wherein the parameters comprise at least one of the following: a parallel algorithm being used, and the number of iterations.

21. The decoding method according to claim 14, further comprising the step of scheduling the first type of the plurality of decoding tasks before the second type of the plurality of decoding tasks based on a priority level.

22. The decoding method of claim 14 wherein the plurality of decoding tasks comprise decoding a plurality of encoded error correction data blocks of the received data.

23. The decoding method of claim 22 wherein the encoded error correction data blocks comprise forward error correction codes.

24. The decoding apparatus of claim 23 wherein the first decoding mode comprises viterbi decoding.

25. The decoding method of claim 23 wherein the second decoding mode comprises turbo decoding.

26. The decoding method of claim 14 wherein:
   the first type of the plurality of decoding tasks are received through any one of the plurality of channels; and
   the second type of the plurality of decoding tasks are received through any one of the plurality of channels.

* * * * *